(12) United States Patent
Allen et al.

(10) Patent No.: US 7,612,963 B2
(45) Date of Patent: Nov. 3, 2009

(54) PERPENDICULAR MAGNETIC RECORDING HEAD WITH PHOTORESIST DAM BETWEEN WRITE COIL AND AIR BEARING SURFACE

(75) Inventors: Donald G. Allen, Morgan Hill, CA (US); Edward Hin Pong Lee, San Jose, CA (US); Jennifer Ai-Ming Leung, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 393 days.

(21) Appl. No.: 11/478,925

(22) Filed: Jun. 30, 2006

(65) Prior Publication Data

US 2008/0002290 A1 Jan. 3, 2008

(51) Int. Cl.
G11B 5/17 (2006.01)
G11B 5/31 (2006.01)
G11B 5/39 (2006.01)

(52) U.S. Cl. .............................. 360/123.06; 360/123.12

(58) Field of Classification Search ................................. 360/123.02–123.12, 123.56
See application file for complete search history.

(56) References Cited

U.S. PATENT DOCUMENTS

| 5,563,754 A | 10/1996 | Gray et al. ................... 360/126 |
| 6,757,141 B2* | 6/2004 | Santini et al. ........... 360/123.09 |
| 2002/0181162 A1 | 12/2002 | Chen et al. ................... 360/317 |
| 2005/0047014 A1 | 3/2005 | Bedell et al. ................ 360/126 |

* cited by examiner

Primary Examiner—Craig A. Renner
(74) Attorney, Agent, or Firm—Zilka-Kotab, PC

(57) ABSTRACT

A magnetic recording head for use in perpendicular magnetic recording having a design that allows the write coil to be manufactured by a damascene process for increased coil pitch and reduced coil resistance. The magnetic write head includes a photoresist dam structure that allows a hard baked photoresist to be formed that does not extend to the air bearing surface (ABS). Since the photoresist dam prevents the hard baked photoresist from reaching the ABS, the damascene process, in which the hard baked photoresist remains in the finished write head, can be used to produce the write head. The use of such a damascene process advantageously allows the space between the coil turns to be reduced, which maximizes the number of turns that can be used and also maximizes the number width to which the coil turns can be constructed, thereby minimizing the electrical resistance of the write coil.

7 Claims, 19 Drawing Sheets

PERPENDICULAR MAGNETIC RECORDING HEAD WITH PHOTORESIST DAM BETWEEN WRITE COIL AND AIR BEARING SURFACE

FIELD OF THE INVENTION

The present invention relates to the manufacture of perpendicular magnetic recording heads and more particularly to a structure that allows the use of a damascene process for the manufacture of a high pitch write coil in a perpendicular magnetic write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in one or more insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In current read head designs a spin valve sensor, also referred to as a giant magnetoresistive (GMR) sensor, is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In order to further increase the performance of a write pole, whether perpendicular or longitudinal, it is necessary to maximize the amount of write field produced by the write coil. The write field can be increased in two ways. First, the amount of write current flowing through the coil can be increased. This however is limited by the amount of heat that can be tolerated as a result of the flow of current through the coil, which, of course, is affected by the resistance of the coil itself. The other way in which the magnetic write field can be increased, is by increasing the number of coil turns passing between the poles of the yoke. This is limited by the space limitations within the yoke.

A traditional process for constructing a coil has involved first depositing an electrically conductive seed layer, and then forming a hard baked photoresist frame over the seed layer. The photoresist layer is constructed with a trench that extends to the seed layer and which defines the coil pattern. After plating the coil, this hard baked photoresist frame must be removed in order to remove the unwanted portions of the seed layer, such as by sputter etching. The seed layer must be removed in order to prevent shorting.

More recently, in longitudinal write head designs a damascene process has been used to construct coils having a higher pitch. The damascene process involves forming a hard baked layer of photoresist, constructing a hard mask over the resist, patterned to define a coil pattern and then removing exposed portions of the hard baked resist to form a coil pattern in the resist. The seed layer is then deposited and the coil is plated. A chemical mechanical polish (CMP) is then used to remove unwanted portions of electrically conductive material deposited over the top of the mask. Because the seed is not deposited beneath the hard baked photoresist layer, this layer can be left intact after the coil has been formed. This allows the coils turns to be formed much closer together.

A feature of hard baked photoresist is that it must be allowed to flow significantly beyond the location where it is needed. In other words the edges of the photoresist layer taper gradually toward the substrate on which the photoresist is deposited. The materials exposed at the air bearing surface (ABS) must be either magnetic pole material or a hard insulating material such as alumina. Hard baked photoresist can not be exposed at the ABS. In a longitudinal head this is not a problem, because the longitudinal write head is formed with a magnetic pedestal that prevents the photoresist layer from flowing to the air bearing surface.

However, in a perpendicular magnetic write head, there is no need for such as magnetic pedestal between the write coil and the ABS. Although some perpendicular write heads have a pedestal in the form of a magnetic shield that extends from the return pole toward the write pole, that pedestal is not necessary and is not included in many designs. In a perpendicular magnetic write head that does not have such a pedestal, there is no structure to provide a dam to prevent a photoresist insulation layer from flowing to the ABS. In that case, the space between the coil and the ABS is usually filled with a hard, non-magnetic, insulating material such as alumina. This alumina layer is deposited after the formation of the coil. A hard material such as alumina is needed at the ABS, to provide sufficient protection against corrosion, abrasion, etc. As mentioned above, a hard baked photoresist insulation layer cannot be allowed to extend to the ABS. Because of this, only more traditional coil formation processes (where the resist is completely removed after coil formation) have been used in perpendicular write heads having no pedestal structure. The advantages of using damascene coil formation processes have, therefore, not been available in the construction of such perpendicular write heads.

Therefore, there is a strong felt need for a write pole design that can allow a high pitch coil to be constructed in a perpendicular write head having no pedestal. Such as design must be easily manufacturable, using processes that will not add significant cost or complexity to the head construction.

SUMMARY OF THE INVENTION

The present invention provides a write head for use in perpendicular magnetic data recording head that has a high coil pitch, with minimal spacing between coil turns. A novel write head design according to an embodiment of the invention allows the write coil to be constructed by a damascene process while also preventing any hard baked photoresist material from being exposed at the air bearing surface of the finished write head.

The invention includes a magnetic return pole, and a magnetic write pole. The write pole and return are magnetically connected with one another in a region disposed away from the air bearing surface (ABS). An electrically conductive write coil passes between the write pole and the return pole. A photoresist dam structure is disposed between the write coil and the ABS.

The photoresist dam structure is preferably constructed of a non-magnetic, electrically conductive material, such as copper (Cu) and preferably contacts the write coil, thereby effectively becoming a part of the outermost turn of the write coil and thereby decreasing the electrical resistance of the outermost turn of the write coil.

By including the photoresist dam structure in the write head, a damascene process can be used to construct the write coil. A damascene process allows the coils to be constructed much more closely together than is possible using more convention methods, because the photoresist layer used in the construction of the coil is left intact and is not removed after construction of the coil. This allows the coil to be constructing with an increased pitch, maximizing the number of coil turns and minimizing the electrical resistance of the coil. The damascene process also advantageously allows the write head to be constructed with a shorter yoke length without increasing coil resistance or decreasing the number of coil turns. This shorter yoke length results in faster data rate.

The damascene process, made possible by the present invention, includes depositing a photoresist layer and then patterning and developing the photoresist layer so that it covers a region where the coil will be constructed. The photoresist layer is heated so that it becomes a hard baked photoresist layer. This hard baked photoresist layer generally has gradually sloping edges that round down to the substrate on which it is formed. However, because of the presence of the photoresist dam, this photoresist layer does not extend into the ABS region. The photoresist dam prevents the hard baked resist layer from flowing into the ABS, causing the hard baked resist to have an abrupt edge that stops short of the ABS.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
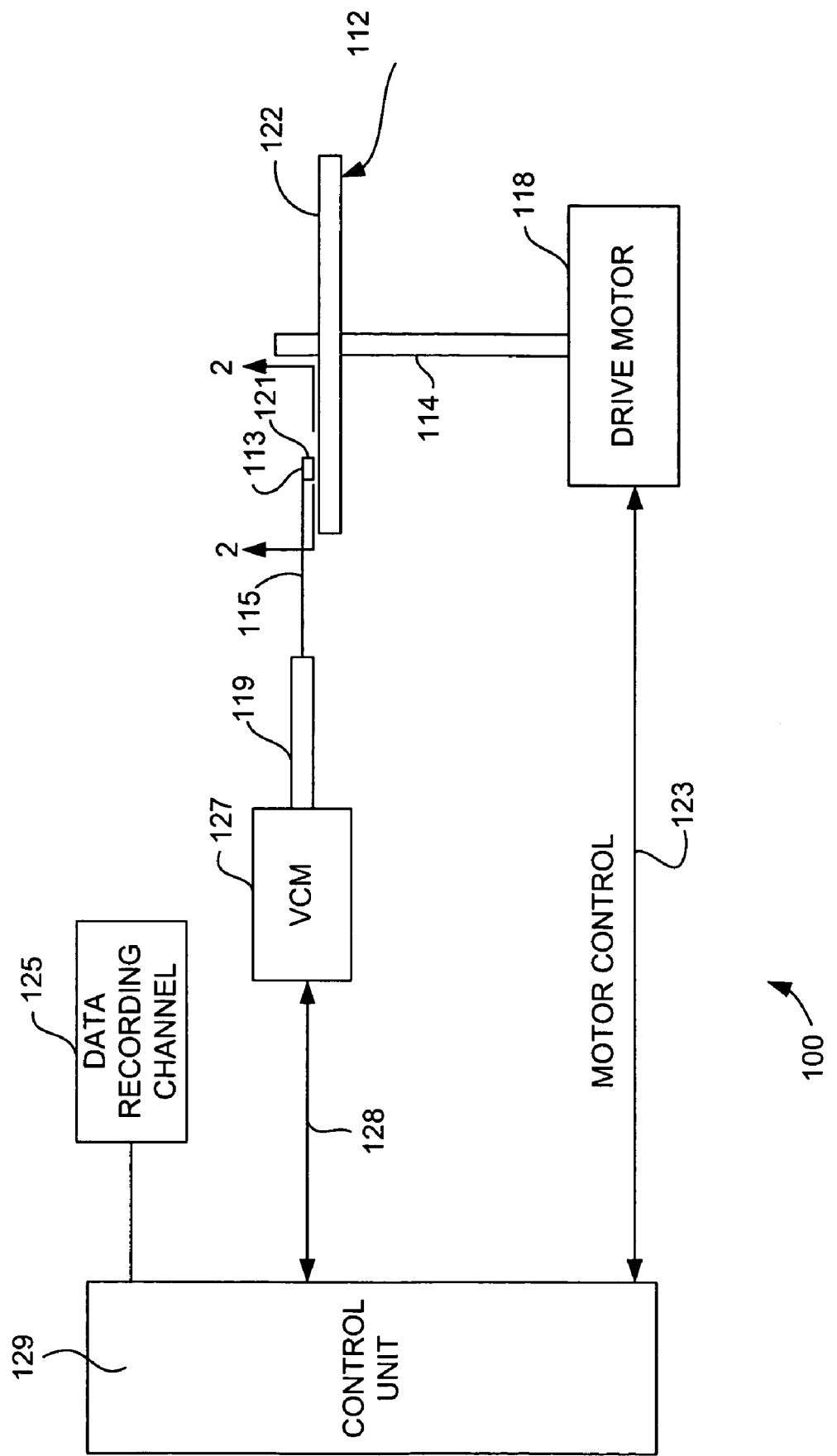
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
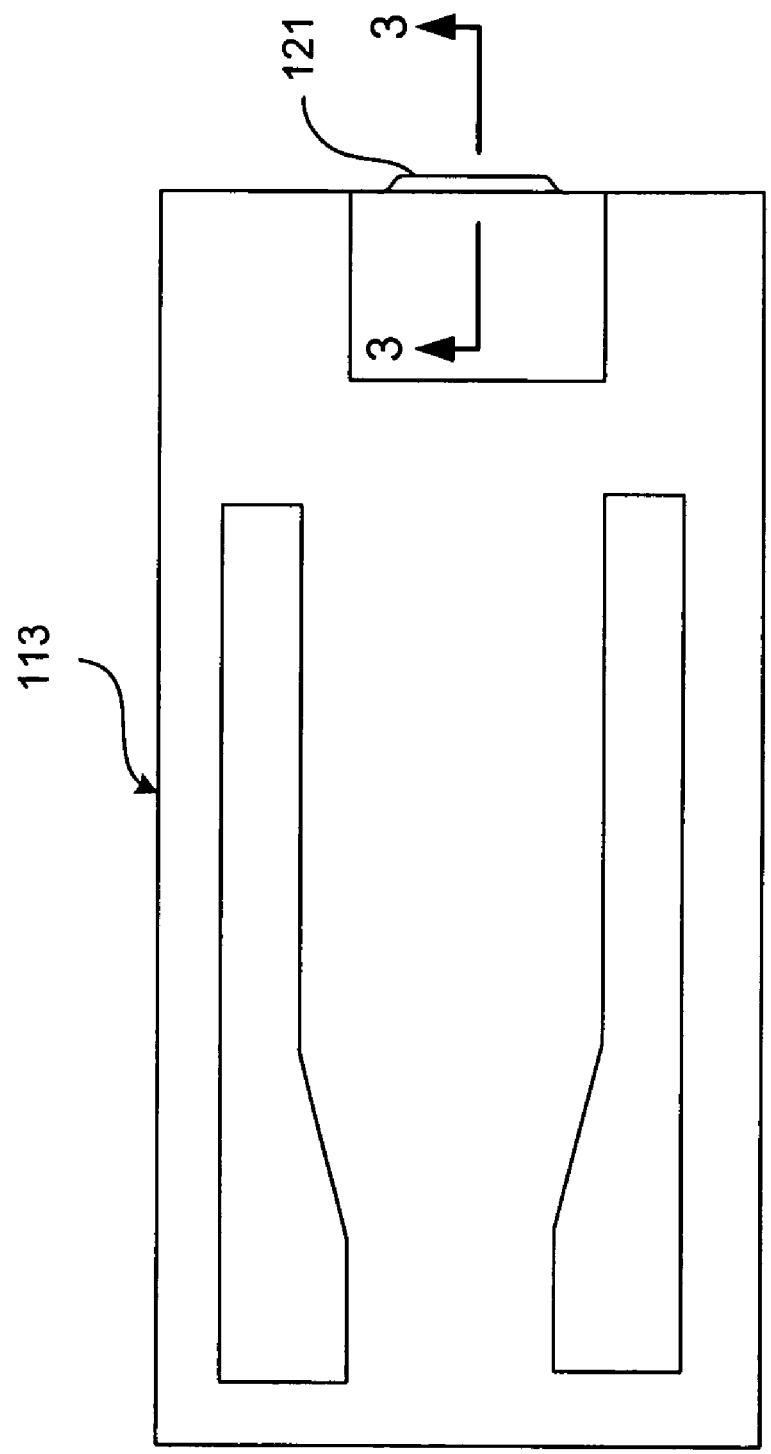
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
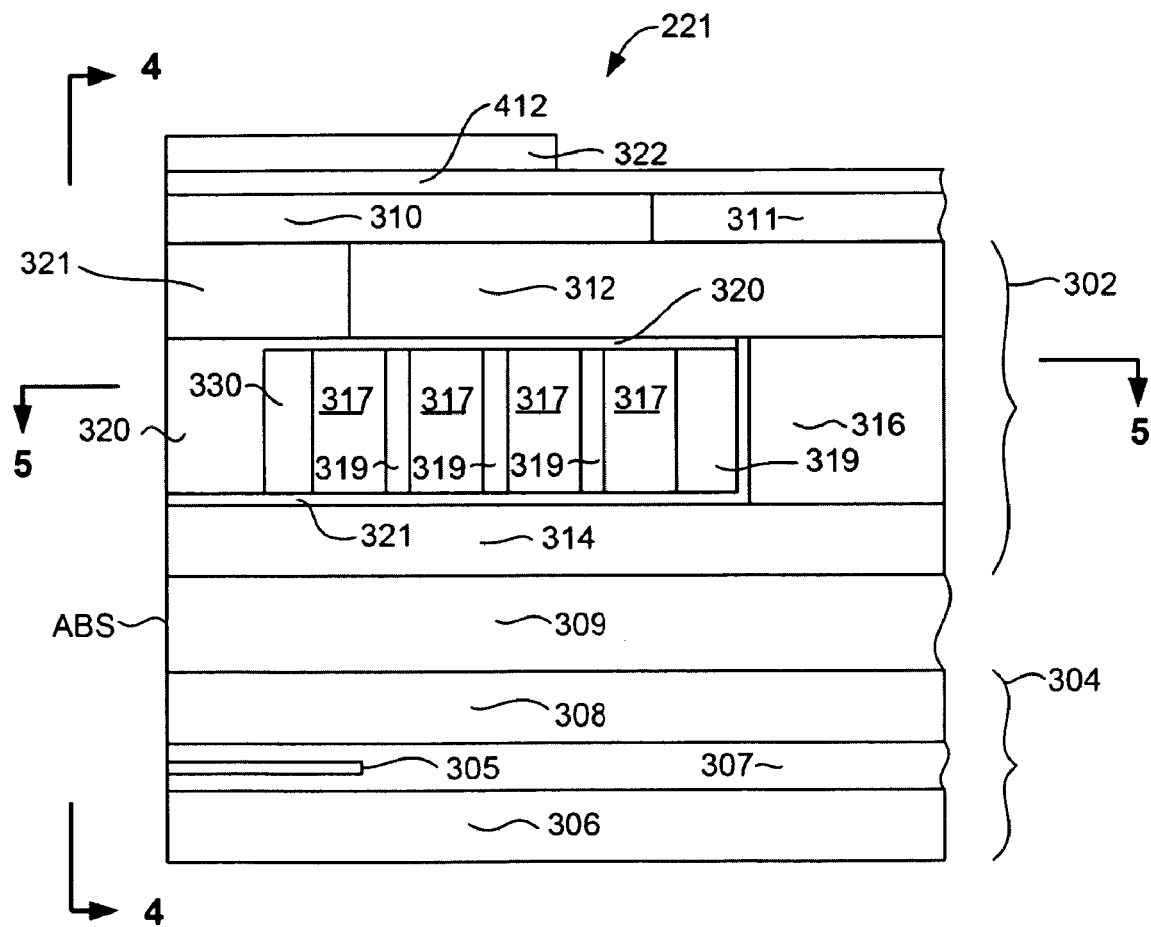
FIG. 3 is a cross sectional view of a magnetic head taken from line 3-3 of FIG. 2, enlarged, and rotated 90 degrees counterclockwise.

With reference now to FIG. 3, the magnetic head 221 for use in a perpendicular magnetic recording system is described. The head 221 includes a write element 302 and a read element 304. The read element 304 includes a read sensor 305 that is preferably a giant magnetoresistive (GMR) sensor and is preferably a current perpendicular to plane (CPP) GMR sensor. CPP GMR sensors are particularly well suited for use in perpendicular recording systems. However, the sensor 305 could be another type of sensor such as a current in plane (CIP) GMR sensor, a tunnel junction sensor (TMR) or some other type of sensor. The sensor 305 is located between and insulated from first and second magnetic shields 306, 308 and embedded in a dielectric material 307. The magnetic shields 306, 308, which can be constructed of for example CoFe or NiFe, absorb magnetic fields, such as those from up-track or down-track data signals, ensuring that the read sensor 305 only detects the desired data track located between the shields 306, 308. A non-magnetic, electrically insulating gap layer 309 may be provided between the shield 308 and the write head 302.

Figure 4:
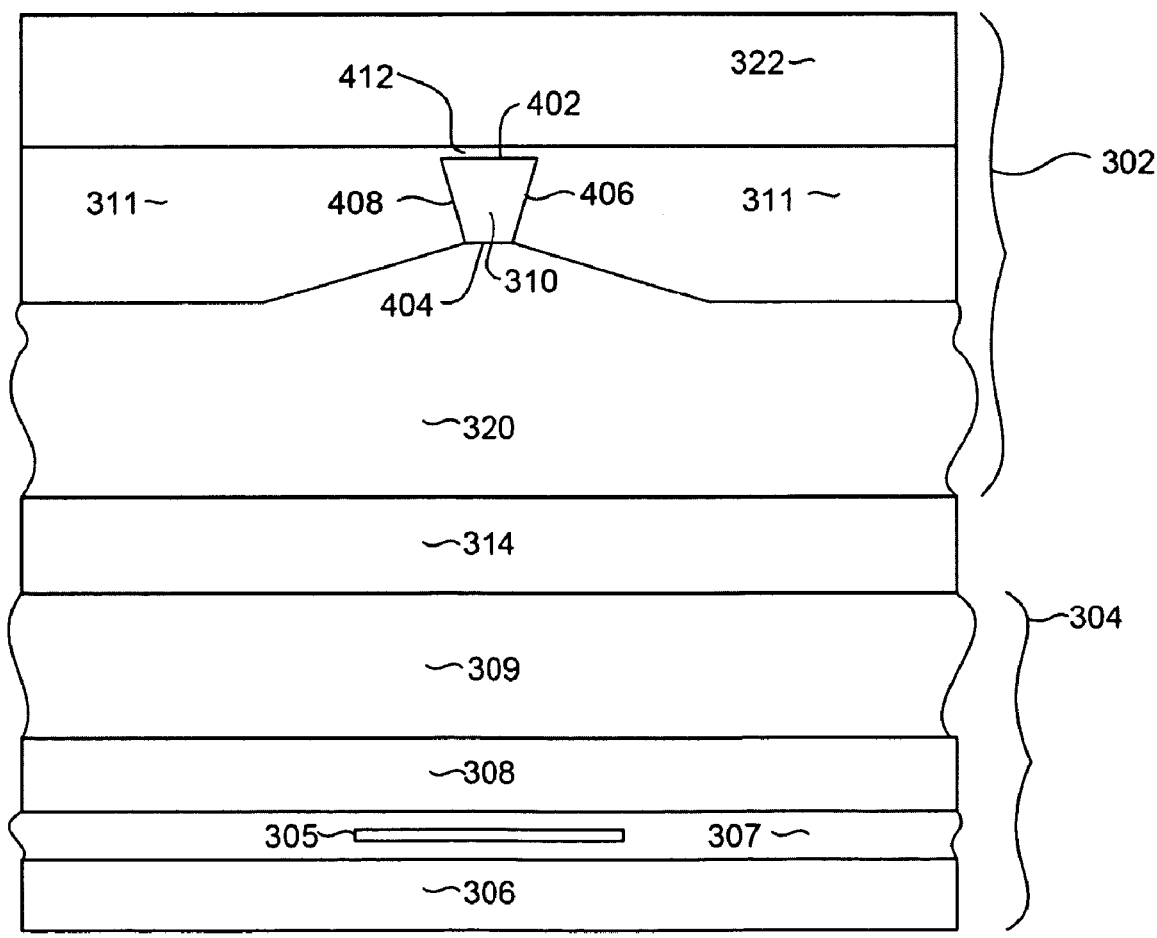
FIG. 4 is an ABS view, taken from line 4-4 of FIG. 3 of a magnetic head according to an embodiment of the present invention.

With continued reference to FIG. 3, the write element 302 includes a write pole 310 that is magnetically connected with a magnetic shaping layer 312, and is embedded within an insulation material 311. As shown in FIG. 4, the write pole 310 has a small cross section at the air bearing surface and is constructed of a material having a high saturation moment, such as NiFe or CoFe. The write head 302 also includes a return pole 314 that is constructed of a magnetic material such as CoFe or NiFe and has a cross section parallel to the ABS surface that is significantly larger than that of write pole 310 as shown in FIG. 4. The return pole 314 is magnetically connected with the shaping layer 312 and write pole 310 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by a non-magnetic, electrically insulating hard baked photoresist material (coil insulation layer 319) that extends behind the coil 317 and between the turns of the coil 317, electrically insulating the turns of the coil 317 from one another and electrically isolating the coil 317 from the back gap 316. One or more layers of another insulating material 320 are also provided, and are preferably constructed of a hard, non-magnetic, electrically insulating material such as alumina. This other insulating material 320 can extend over the top and under the bottom of the coil 317, and also fills a space near the air bearing surface (ABS).

When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown). The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials, whereas the insulation layer 319 is preferably hard baked photoresist as mentioned above.

A photoresist dam structure 330 is provided between the ABS and the write coil 317. The photoresist dam 330 is preferably constructed of an electrically conductive material, which preferably contacts the write coil 317. In this way, the dam 330 functions as a portion of the outermost turn of the write coil 317. Since this outermost coil turn has the greatest length of all of the coil turns, it typically has the highest electrical resistance. By constructing the dam 330 of an electrically conductive material and making it contact the write coil 317, the dam significantly reduces the electrical resistance of this outer coil turn. As can be seen, the hard, alumina insulation layer 320 extends from the photoresist dam 330 to the ABS.

The write head element 302 may also include a trailing magnetic shield 322. The write pole 310 has a trailing edge 402 and a leading edge 404, as can be seen with reference to FIG. 4. The terms trailing and leading edges 402, 404 are with respect to the direction of travel relative to a data track when the write head 302 is in use. The write pole 310 also preferably has first and second laterally opposing sides 406, 408 that are configured to define a width at the leading edge 404 that is narrower than the width at the trailing edge 404, forming a write pole 310 having a trapezoidal shape. This trapezoidal shape is useful in preventing adjacent track writing due to skew of the write head 302 when the head 302 is located at extreme outer or inner positions over the disk. However, this trapezoidal shape of the write head 310 is not necessary to practice the present invention.

With continued reference to FIG. 4, the magnetic trailing shield 322 is separated from the write pole 310, by a trailing gap 412, which is filled with a non-magnetic material such as Rh or alumina. The trailing shield gap is constructed to have a thickness to provide a desired amount of write field canting, while not causing too much field to leak to the shield 322, which would result in a loss of write field performance. The trailing shield 322 can be constructed of a magnetic material such as NiFe.

Figure 5:
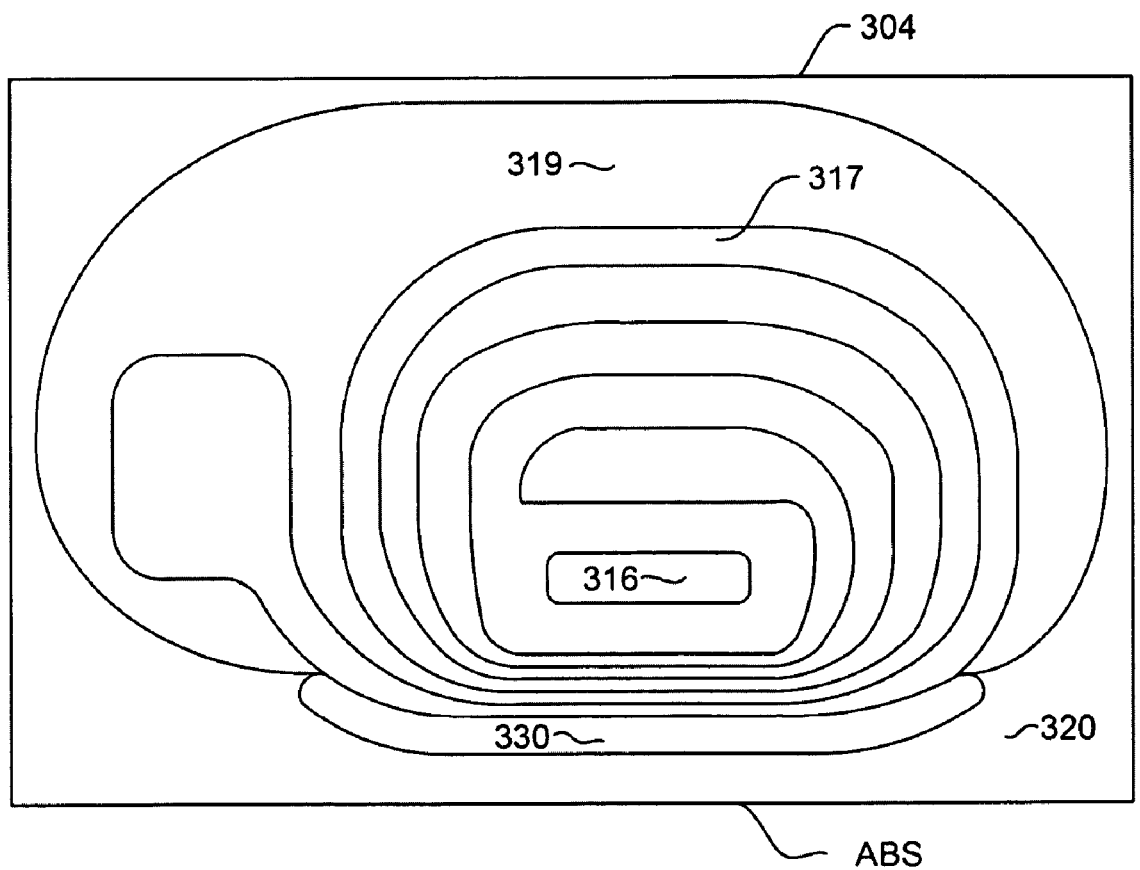
FIG. 5 is a top down view taken from line 5-5 of FIG. 3.

With reference now to FIG. 5, a top-down view of the write head 302 is shown. The write head 302 is shown incorporated on a wafer prior to lapping. As those skilled in the art will appreciate, many such write heads 302 are formed in rows on a wafer. In a later stage of manufacture, the wafer will be cut into rows of heads and a lapping process will be performed to define an air bearing surface at a location indicated by the line denoted as ABS.

In the top down, sectional view of FIG. 5, the write coil 317 can be seen, as well as the magnetic back gap 316. The photoresist dam 330, extends across the front of the coil 317, between the coil 317 and the ABS. As can be seen, the hard baked photoresist insulation layer 319, extends beyond the coil 317 in regions at either side of and behind the coil 317. However, because the photoresist dam 330 acts as a barrier at the ABS side of the coil 317, the hard baked photoresist layer 317 does not extend to the ABS. In other words, the photoresist dam 330 prevents the hard baked photoresist layer 330 from flowing to the ABS. The substantially harder alumina layer 320 fills areas outside of the hard baked photoresist layer, and as can be seen extends to and beyond the ABS. This is desired, because the hard alumina layer provides an advantageously hard, non-corrosive material for exposure at the air bearing surface.

With reference now to FIGS. 5-19, a method for constructing a write head according to an embodiment of the invention is described. The use of the photoresist dam 330 described above, allows the coil 317 to be constructed by a damascene process that allows the coil 317 to be constructed with a desired high pitch and small spacing between the coil turns.

Figure 6:
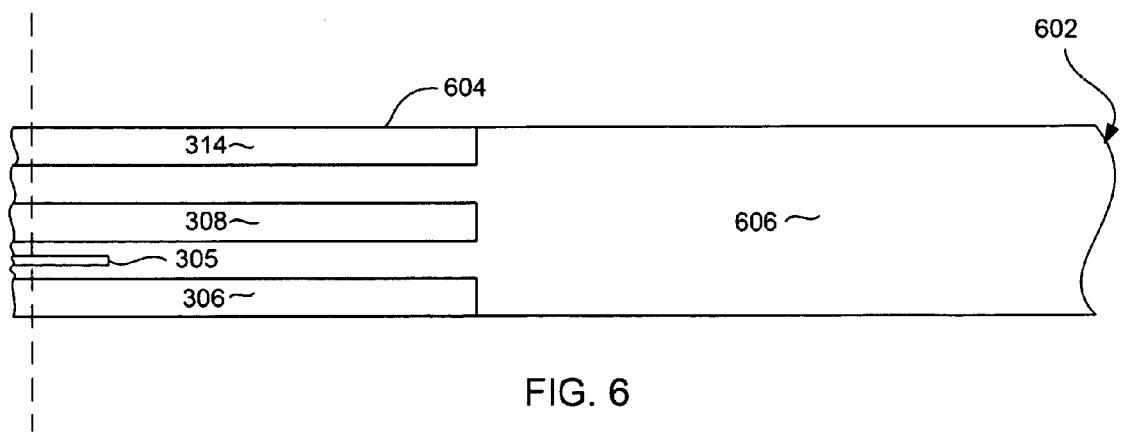
FIGS. 6-19 are cross sectional views illustrating a method of manufacturing a perpendicular magnetic write head according to an embodiment of the invention.

With reference to FIG. 6, a substrate 602 is provided, preferably having a smooth planar upper surface 604. The substrate can include the read sensor 305 and magnetic shields 306, 308 discussed above. The substrate may also include one or more non-magnetic, electrically insulating fill layers 606. The smooth, planar surface 604 can be provided by a chemical mechanical polishing process (CMP). The substrate also includes a magnetic return pole 314, having a top surface that is coplanar with the rest of the surface 604 of the substrate. The return pole 314 as well as the rest of the substrate can be constructed by methods familiar to those skilled in the art, which may include various photolithography, electroplating, insulation deposition processes. Although the air bearing surface (ABS) has not yet been formed, there is an ABS location (indicated by dashed line denoted ABS) where the ABS will be located after a future lapping process. This location will be referred to herein as ABS.

Figure 7:
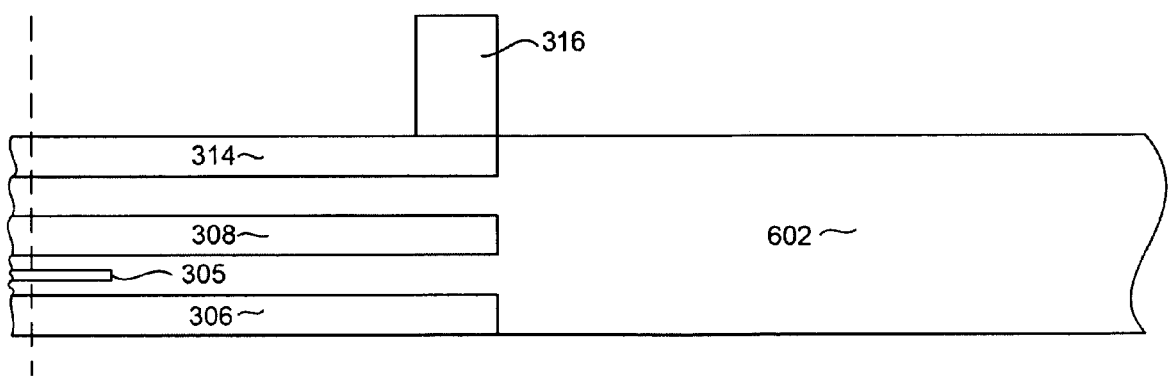

With reference to FIG. 7, the magnetic back gap 316 can be constructed on the back end of the return pole 314 opposite the ABS location (ABS). The back gap 316 can be constructed of a magnetic material such as NiFe, and can be manufactured by processes familiar to those skilled in the art, which may include: depositing a seed layer, forming a photoresist mask, electroplating a magnetic material, removing the photoresist mask, and sputter etching to remove unwanted portions of the seed layer.

Figure 8:
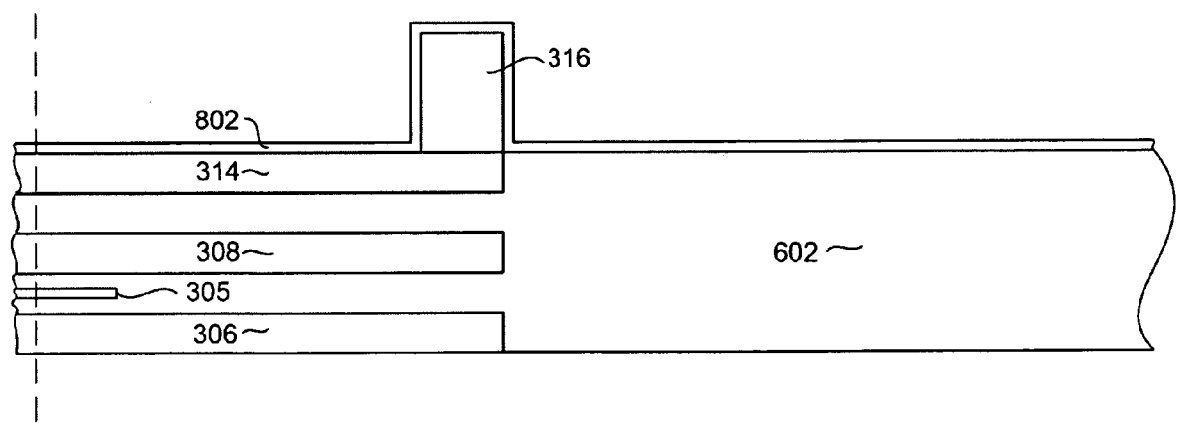
Figure 9:
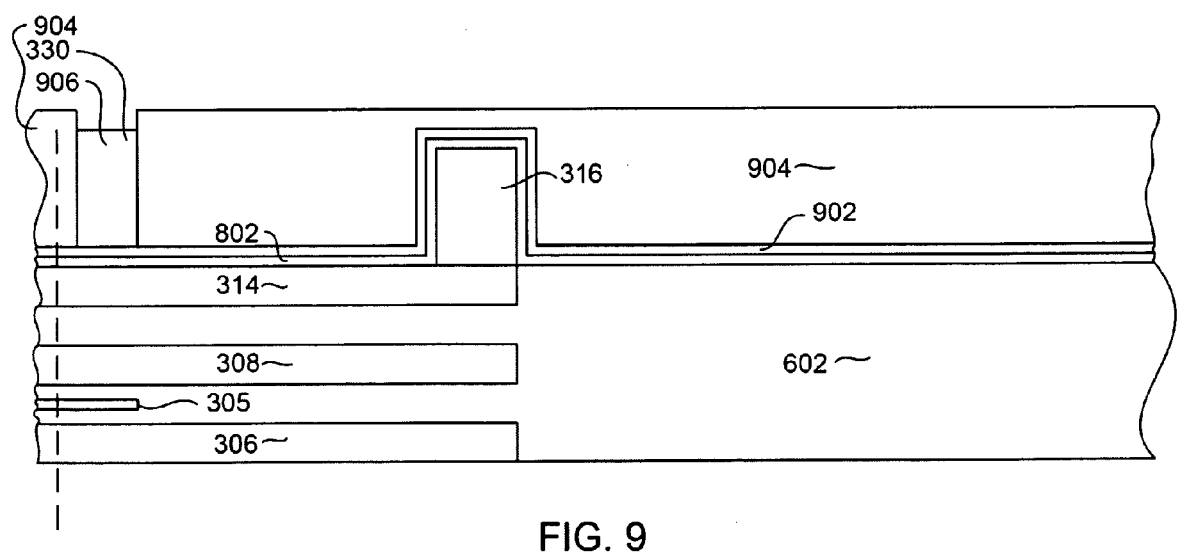
Figure 10:
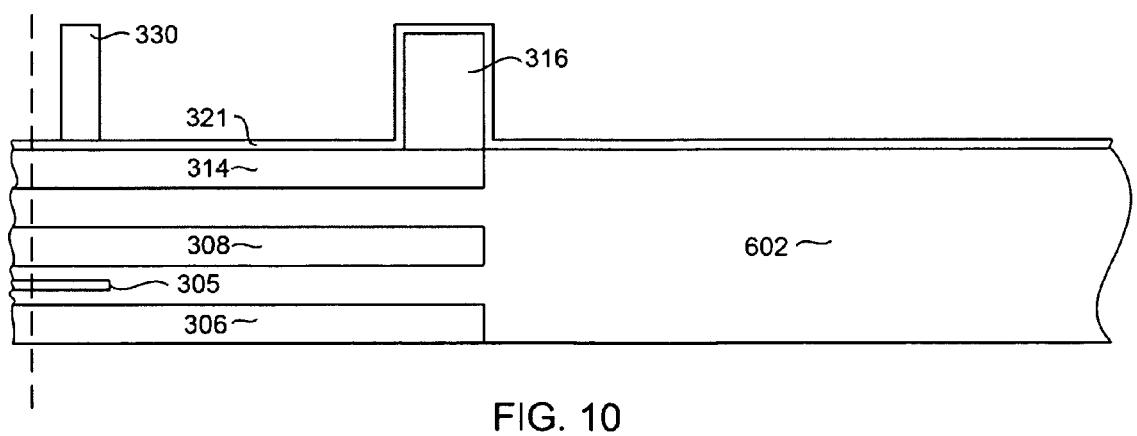

With reference to FIG. 8, after the back gap 316 has been formed, a thin layer of non-magnetic, electrically insulating material 802 such as alumina is deposited. This layer can be deposited by a conformal deposition method such as atomic layer deposition (ALD) or chemical vapor deposition (CVD), or could be deposited by some other deposition process such as sputter deposition With reference now to FIG. 9, the photoresist dam 330 is formed. An electrically conductive seed layer 902, such as a sputter deposited layer of Cu, is deposited over the insulation layer 802. Then, a mask 904 is formed, such as by spinning on a layer of photoresist and then photolithographically patterning and developing the photoresist. The mask 904 is patterned to have an opening configured to define the photoresist dam 330 described earlier with reference to FIG. 3. Then, an electrically conductive material 906 such as Cu is electroplated into the opening in the mask 904 using the seed layer 902 as a plating seed, thereby forming the photoresist dam 330. Then, with reference to FIG. 10, the photoresist mask can be lifted off using a chemical lift off process, leaving the photoresist dam 330. Unwanted portions of the seed layer 902 (those not covered by the photoresist dam 330) can be removed by sputter etching.

Figure 11:
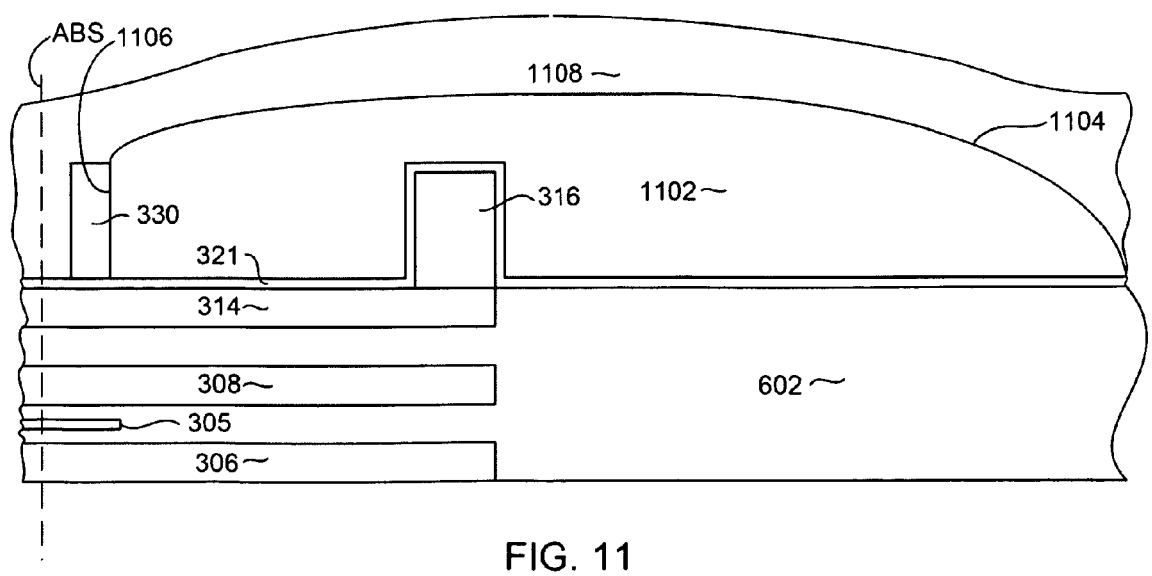

With reference now to FIG. 11, a photoresist layer 1102 is patterned to cover a region where the coil 317 (FIG. 3) will be formed. The photoresist layer 1102 is formed by depositing (spinning on) a layer of photoresist material, then photolithographically patterning, and developing the photoresist layer. The photoresist layer 1102 is then hard baked by heating the photoresist layer 1102. The photoresist layer 1102 is patterned to a somewhat circular shape that (as mentioned above) covers an area where the coil will be formed, but which terminates at the photoresist dam 330. The patterned, hard baked photoresist layer 1102 has a tapered, downward sloping edge 1104 that curves gradually down to the surface of insulation layer 321 on which it is applied. As can be seen however, the presence of the photoresist dam 330 prevents this hard baked photoresist layer 330 from flowing into the region of the ABS. The photoresist dam 330 causes the hard baked photoresist layer 1102 to have an abrupt, substantially vertical edge 1106 near (but recessed from) the ABS.

With continued reference to FIG. 11, a full film layer of alumina ($Al_2O_3$) 1108 is deposited. The alumina layer 1108 is preferably deposited to a thickness at least as great as the height of the photoresist dam 330 and back gap 316, and fills areas outside of the hard baked photoresist layer 1102 as well as covering the photoresist layer 1102.

Figure 12:
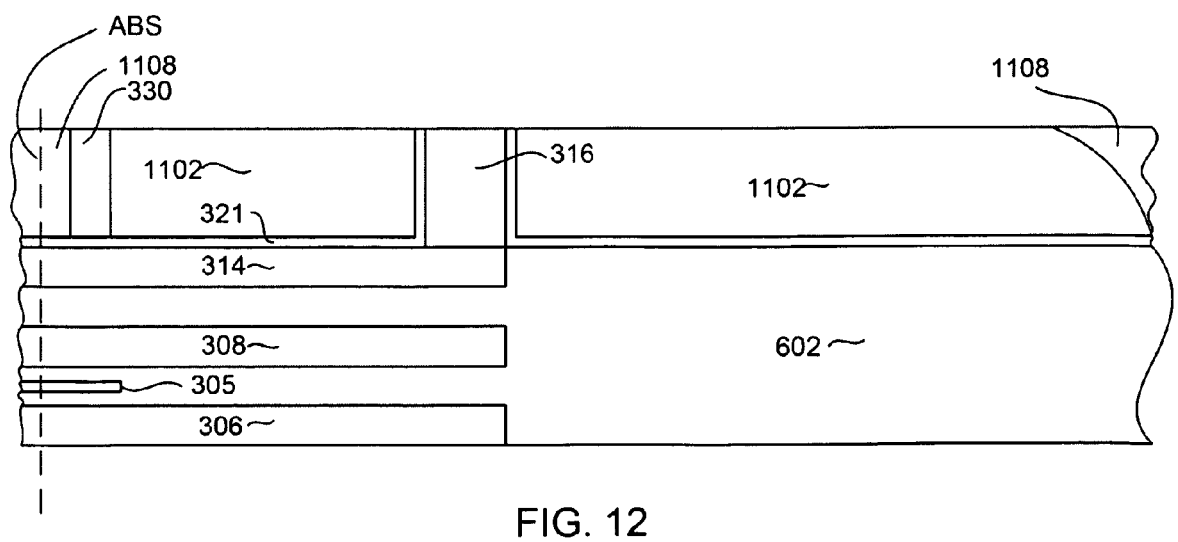

With reference now to FIG. 12, a chemical mechanical (CMP) is performed sufficiently to expose the back gap 316 and photoresist dam 330. The CMP produces a smooth coplanar surface across the hard baked insulation layer 1102, alumina layer 1108, back gap 316 and photoresist dam 330.

Figure 13:
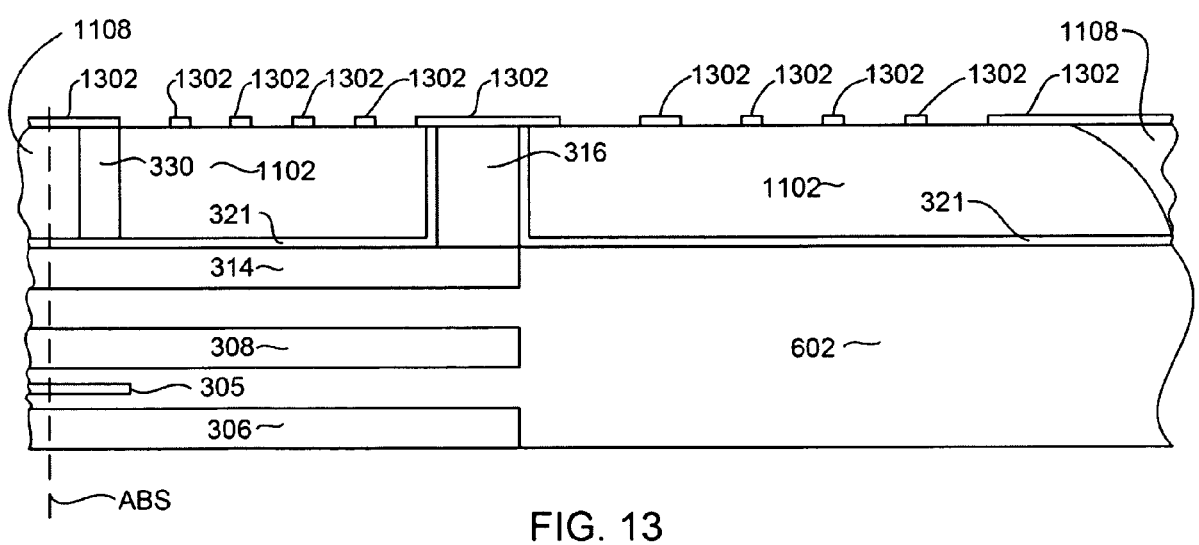

With reference now to FIG. 13, a mask structure 1302 is formed on the hard baked photoresist layer, and is patterned to define the shape of the coil 317 (FIGS. 3 and 5). The mask structure 1302 can be a hard mask which can be constructed of a material such as $SiO_2$ or some other suitable material. The mask 1302 can be formed by depositing a hard mask layer, and then depositing a photoresist layer over the hard mask layer. This photoresist layer can be photolithographically patterned and developed to form a photoresist mask having an opening that defines the coil pattern. Then, a material removal process such as reactive ion etching (RIE) can be performed to transfer the image of the photo mask onto the underlying hard mask. As can be seen, the mask 1302 preferably has an opening that defines a coil having an outer turn that abuts the photoresist dam 330. In other words, a portion of an opening in the mask 1302 has a front edge that is located near the back edge of the photoresist dam 330.

Figure 14:
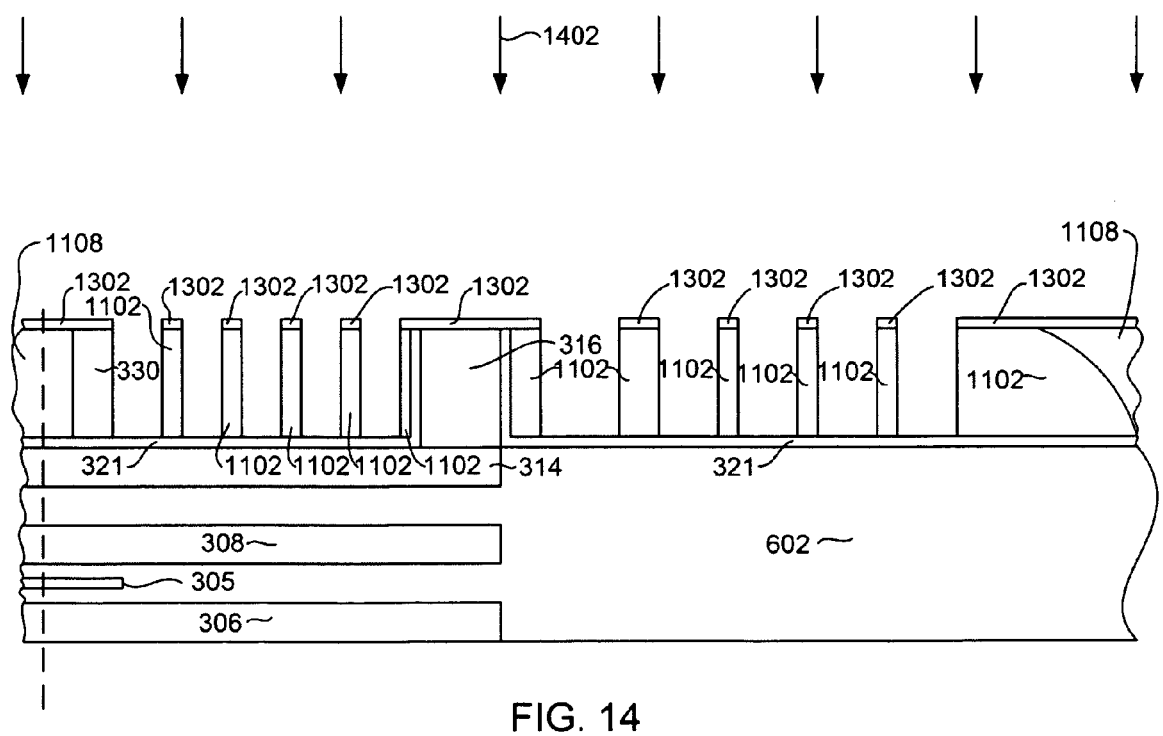
Figure 15:
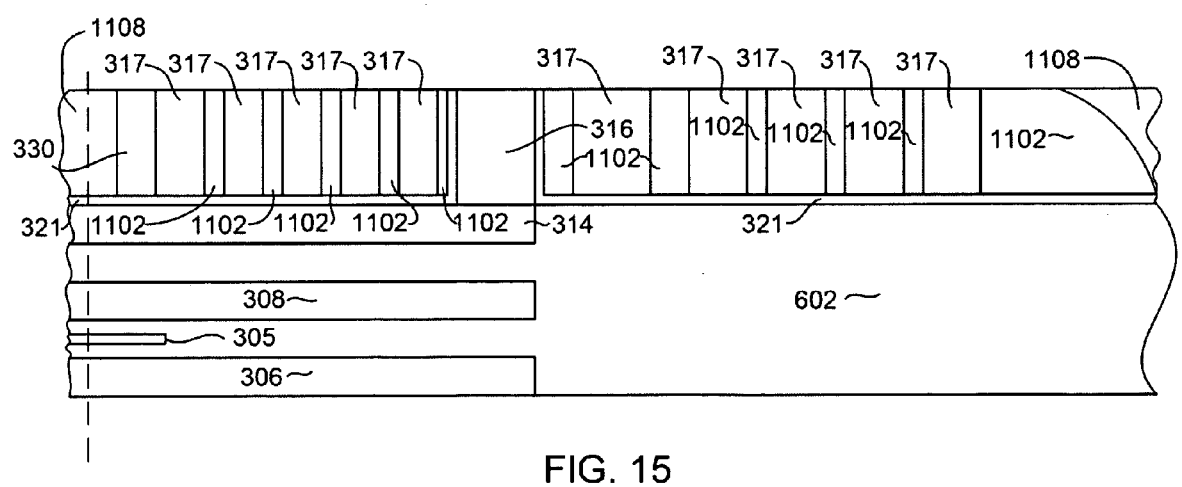

With reference to FIG. 14, a material removal process such as reactive ion etching (RIE) 1402 is performed to remove portions of the hard baked photoresist layer 1102 that are not covered by the mask 1302. In this way, a trench having a coil pattern is formed in the hard baked photoresist 1102. Then, with reference to FIG. 15 a non-magnetic, electrically conductive material such as Cu is deposited into the trench formed in the hard baked photoresist layer 1102, thereby forming the coil 317. More specifically, the deposition of electrically conductive material into the trench can be performed by depositing an electrically conductive seed layer, such as copper (Cu), such as by sputter deposition. Then, an electrically conductive material such as Cu is electroplated. A chemical mechanical polishing process (CMP) is then performed to remove portions of the electroplated material as well as the seed layer material from areas outside of the trench. This method of forming a coil has been referred to as a damascene process and it has the advantage that, since the seed layer is deposited over the top of the hard baked photoresist, rather than under it, the hard baked photoresist layer 1102 can be left intact as a coil insulation layer. Since the hard baked photoresist material 1102 does not have to be removed from between the turns of the coil 317, the coil turns can be spaced much closer together. This advantageously allows the coil turns to be made as wide as possible (reducing electrical resistance and its resulting heat), while also allowing a maximum number of coil turns to be formed within the write head (maximizing write field).

Figure 16:
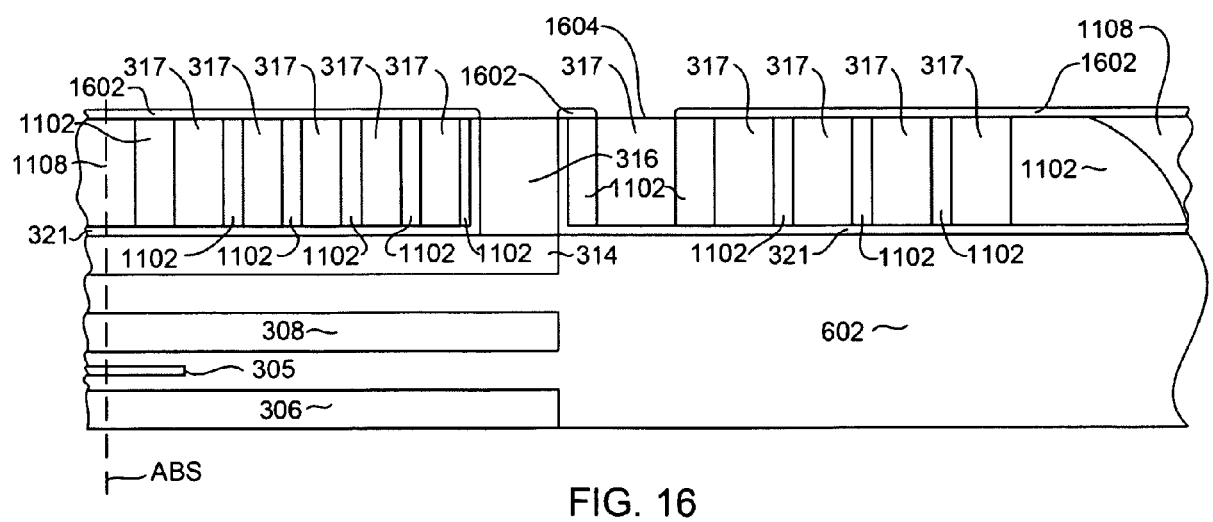

With reference now to FIG. 16, an insulation layer 1602 is deposited over the coil 317 and surrounding areas. The insulation layer 1602 is formed to have an opening over the back gap 316 and can have an opening over a portion of the coil (contact pad 1604) to provide a via for providing a write current to the coil. The insulation layer 1602 can be, for example, alumina and can be formed by a deposition process that deposits the alumina over a bi-layer photoresist mask (not shown) that can be lifted off to expose the back gap 316 and contact pad 1604.

Figure 17:
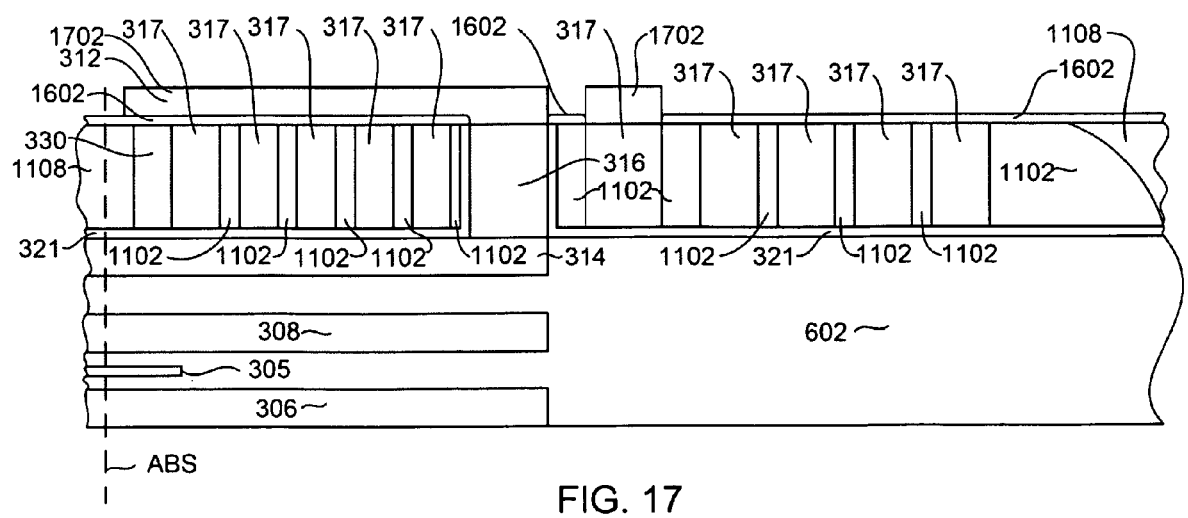
Figure 18:
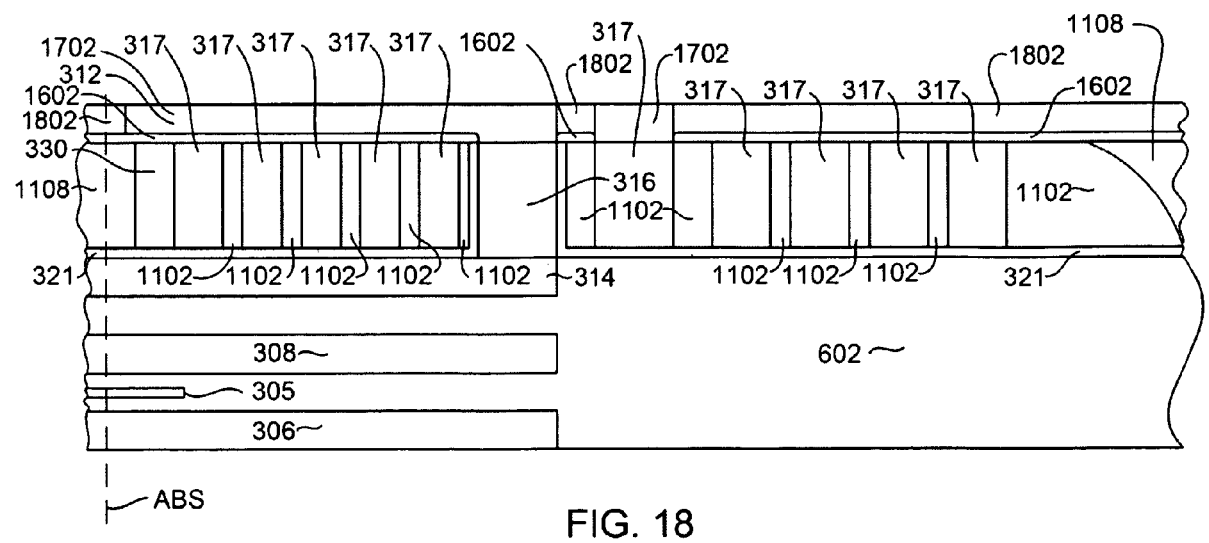

Then, with reference to FIG. 17, a magnetic material 1702 such as NiFe can be deposited. The magnetic material 1702 is patterned to define the shaping layer 312, which contacts the back gap 316. The magnetic material 1702 can be constructed of an electrically conductive material and can be deposited over the contact pad 1604 to facilitate electrical connection with the coil 317. Then, with reference to FIG. 18, a non-magnetic, electrically insulating fill layer 1802 comprising a material such as alumina is deposited and then planarized by chemical mechanical polishing to have a smooth flat surface that is coplanar with the surface of the magnetic layer 1702.

Figure 19:
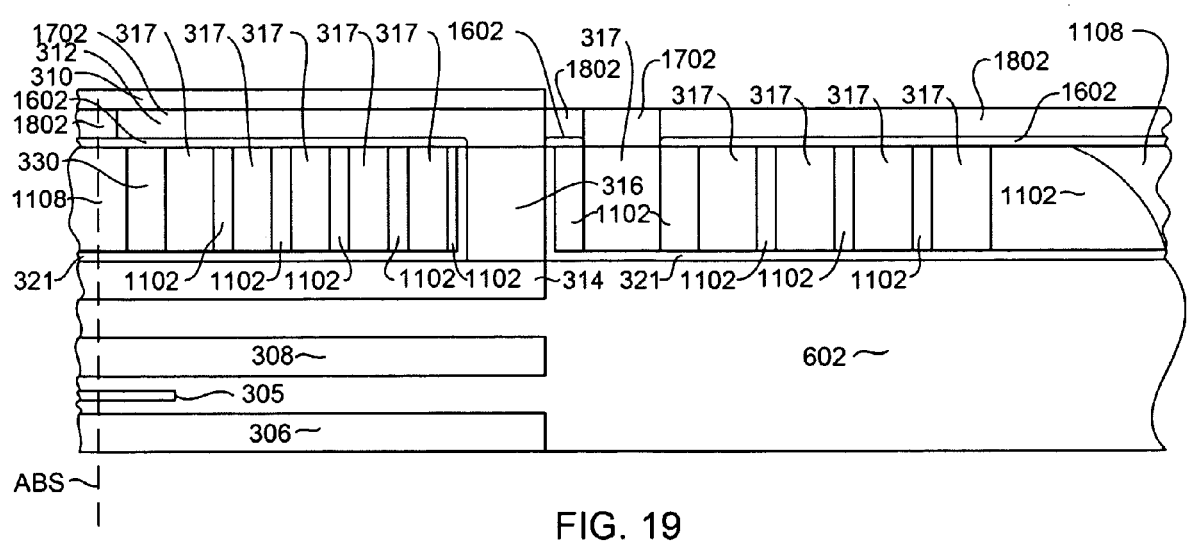

With reference to FIG. 19, a magnetic write pole 310 can be formed over the shaping layer 312 and also over a portion of the insulating fill layer 1802. The write pole 310 can be formed by processes familiar to those skilled in the art, which may include: depositing a write pole material such as a plurality of laminated magnetic layers separated by thin non-magnetic layers; forming a mask structure over the write pole layer; and ion milling to remove portions of the write pole material that are not covered by the mask. The ion mill can be performed at one or more angles to form a write pole tip having a tapered trapezoidal shape.

After forming the write pole, a magnetic trailing shield 322 (FIG. 3) can be formed by depositing a non-magnetic gap layer 412 (FIG. 3) and then depositing a magnetic trailing shield layer. The trailing shield is, however, optional and the construction of the trailing shield is not illustrated in FIG. 19.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic data recording, the write head having an air bearing surface (ABS), the magnetic write head comprising:
   a magnetic return pole;
   a magnetic write pole that is magnetically connected with the return pole in a region away from the ABS;
   a write coil passing between the write pole and the return pole, the write coil being electrically insulated from the write pole and return pole; and
   a photoresist dam disposed between the write coil and the ABS;
   wherein the photoresist dam comprises an electrically conductive material and contacts the write coil.

2. A magnetic write head as in claim 1, wherein the photoresist dam and the write coil both comprise copper (Cu) and wherein the photoresist dam contacts the write coil.

3. A magnetic write head for perpendicular magnetic data recording, the write head having an air bearing surface (ABS), the magnetic head comprising:
   a magnetic return pole;
   a magnetic write pole that is magnetically connected with the return pole in a region away from the ABS;
   a write coil having a plurality of turns, a portion of which pass between the write pole and the return pole, the write coil being electrically insulated from the write pole and return pole;
   a coil insulation layer comprising hard baked photoresist disposed between and insulating the turns of the coil from one another; and
   a photoresist dam disposed between the write coil and the ABS;
   wherein the photoresist dam and the write coil are constructed of the same electrically conductive material.

4. A magnetic write head as in claim 3 further comprising a fill layer comprising alumina disposed between the photoresist dam and the ABS.

5. A magnetic write head as in claim 3 wherein the photoresist dam contacts the write coil.

6. A magnetic write head as in claim 3 wherein the photoresist dam and the coil both comprise copper (Cu) and wherein the photoresist dam contacts the write coil.

7. A magnetic write head for perpendicular magnetic data recording, the write head having an air bearing surface (ABS), the magnetic head comprising:
   a magnetic return pole;
   a magnetic write pole that is magnetically connected with the return pole in a region away from the ABS;
   an electrically conductive write coil having a plurality of turns, a portion of which pass between the write pole and the return pole;
   a coil insulation layer comprising hard baked photoresist, a portion of which is disposed between the turns of the write coil; and
   an alumina fill layer disposed between the write coil and the ABS;
   wherein the write coil has an outermost turn that passes closer to the ABS than the other coil turns, and wherein the outermost coil turn is wider than the other coil turns in a region where the coil turns pass between the return pole and the write pole; and
   wherein the outermost coil turn, in the region that passes between the return pole and the write pole, comprises a coil turn portion and a photoresist dam portion, both of which are constructed of copper (Cu).

* * * * *